US012393920B2

(12) United States Patent
Handshaw et al.

(10) Patent No.: US 12,393,920 B2
(45) Date of Patent: Aug. 19, 2025

(54) BARCODE READER WITH OFF-PLATTER DETECTION ASSEMBLY

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 851 days.

(21) Appl. No.: 17/677,753

(22) Filed: Feb. 22, 2022

(65) Prior Publication Data
US 2023/0267439 A1    Aug. 24, 2023

(51) Int. Cl.
| | |
|---|---|
| G01G 19/414 | (2006.01) |
| G01S 7/4865 | (2020.01) |
| G01S 7/497 | (2006.01) |
| G01S 17/88 | (2006.01) |
| G06K 7/10 | (2006.01) |
| G06K 7/14 | (2006.01) |
| G06Q 20/20 | (2012.01) |
| G06T 7/00 | (2017.01) |

(52) U.S. Cl.
CPC .......... *G06Q 20/208* (2013.01); *G01S 7/4865* (2013.01); *G01S 7/497* (2013.01); *G01S 17/88* (2013.01); *G06K 7/10732* (2013.01); *G06K 7/10792* (2013.01); *G06K 7/1096* (2013.01); *G06K 7/1413* (2013.01); *G06T 7/0002* (2013.01)

(58) Field of Classification Search
CPC .......... G06K 7/10792; G06K 7/10861; G01G 19/4144
USPC .................................................. 235/462.13
See application file for complete search history.

(56) References Cited

U.S. PATENT DOCUMENTS

| | | | |
|---|---|---|---|
| 8,878,437 B1 | 11/2014 | Gordin et al. | |
| 2008/0147337 A1 | 6/2008 | Walters et al. | |
| 2010/0139989 A1* | 6/2010 | Atwater ............ | G01G 23/3735 382/199 |

(Continued)

OTHER PUBLICATIONS

International Search Report and Written Opinion for International Application No. PCT/US2023/13613 mailed on May 17, 2023.

*Primary Examiner* — Toan C Ly
(74) *Attorney, Agent, or Firm* — Yuri Astvatsaturov

(57) ABSTRACT

Barcode readers with off-platter detection assemblies are disclosed herein. An example barcode reader includes a weigh platter and an off-platter detection assembly including a light emission assembly, a light detection assembly, and a controller. The light emission assembly emits a light along a first lateral edge of the weigh platter and the light detection assembly detects at least a portion of the light from the light emission assembly. The controller is configured to: receive a light detection signal from the light detection assembly; compare the light detection signal to a first signal threshold and a second signal threshold range; execute a first event if the light detection signal is less than the first signal threshold, indicating an off-platter event; and execute a second event if the light detection signal is within the second signal threshold range for a predetermined period of time, indicating a maintenance event.

24 Claims, 7 Drawing Sheets

(56) References Cited

U.S. PATENT DOCUMENTS

| | | |
|---|---|---|
| 2014/0061305 A1 | 3/2014 | Nahill et al. |
| 2015/0330913 A1 | 11/2015 | Heskee, III |
| 2016/0034722 A1 | 2/2016 | Joseph et al. |
| 2021/0190580 A1 | 6/2021 | Barkan et al. |

* cited by examiner

BARCODE READER WITH OFF-PLATTER DETECTION ASSEMBLY

BACKGROUND

Barcode readers, especially bioptic barcode readers used in retail environments, have the potential to become very dirty during use. For example, skins and other flaking components from produce can generate dust very quickly, liquid spills can cover, cloud, or cake on windows and optical surfaces, and users can smudge windows and optical surfaces with fingerprints. This is in addition to normal dust buildup as the barcode reader sits in a counter for years. Barcode readers can also be damaged during use as items are dragged and passed across the barcode reader or if items are dropped onto barcode reader.

Barcode readers that have off-platter detection systems are at risk for reduced performance or complete failure if the optical components associated with the off-platter detection systems become dirty or damaged. Therefore, it would be beneficial to have a barcode reader with an off-platter detection system that could detect when dirty conditions or damage are inhibiting performance of the off-platter detection system.

SUMMARY

In an embodiment, the present invention is a barcode reader configured to be supported by a workstation. The barcode reader comprises a weigh platter configured to measure a weight of an object placed on the weigh platter and an off-platter detection assembly. The off-platter detection assembly comprises a light emission assembly, a light detection assembly, and a controller in communication with the light emission assembly and the light detection assembly. The light emission assembly has a light source and is configured to emit a light along a first lateral edge of the weigh platter and the light detection assembly has a light sensor and is configured to detect at least a portion of the light from the light emission assembly. The controller is configured to: receive a light detection signal from the light detection assembly; compare the light detection signal to a first signal threshold and a second signal threshold range; execute a first event if the light detection signal is less than the first signal threshold, indicating an off-platter event; and execute a second event if the light detection signal is within the second signal threshold range for a predetermined period of time, indicating a maintenance event, wherein a lowest value of the second signal threshold range is greater than the first signal threshold.

In another embodiment, the present invention is a method of monitoring a performance of an off-platter detection assembly, comprising the steps of: emitting a light along a first lateral edge of a weigh platter of the barcode reader with a light emission assembly; receiving a light detection signal from a light detection assembly of the barcode reader at a controller of the barcode reader; comparing, with the controller, the light detection signal to a first signal threshold and a second signal threshold range; executing, with the controller, a first event if the light detection signal is less than the first signal threshold, indicating an off-platter event; and executing, with the controller, a second event if the light detection signal is within the second signal threshold range for a predetermined period of time, indicating a maintenance event, wherein a lowest value of the second signal threshold range is greater than the first signal threshold.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
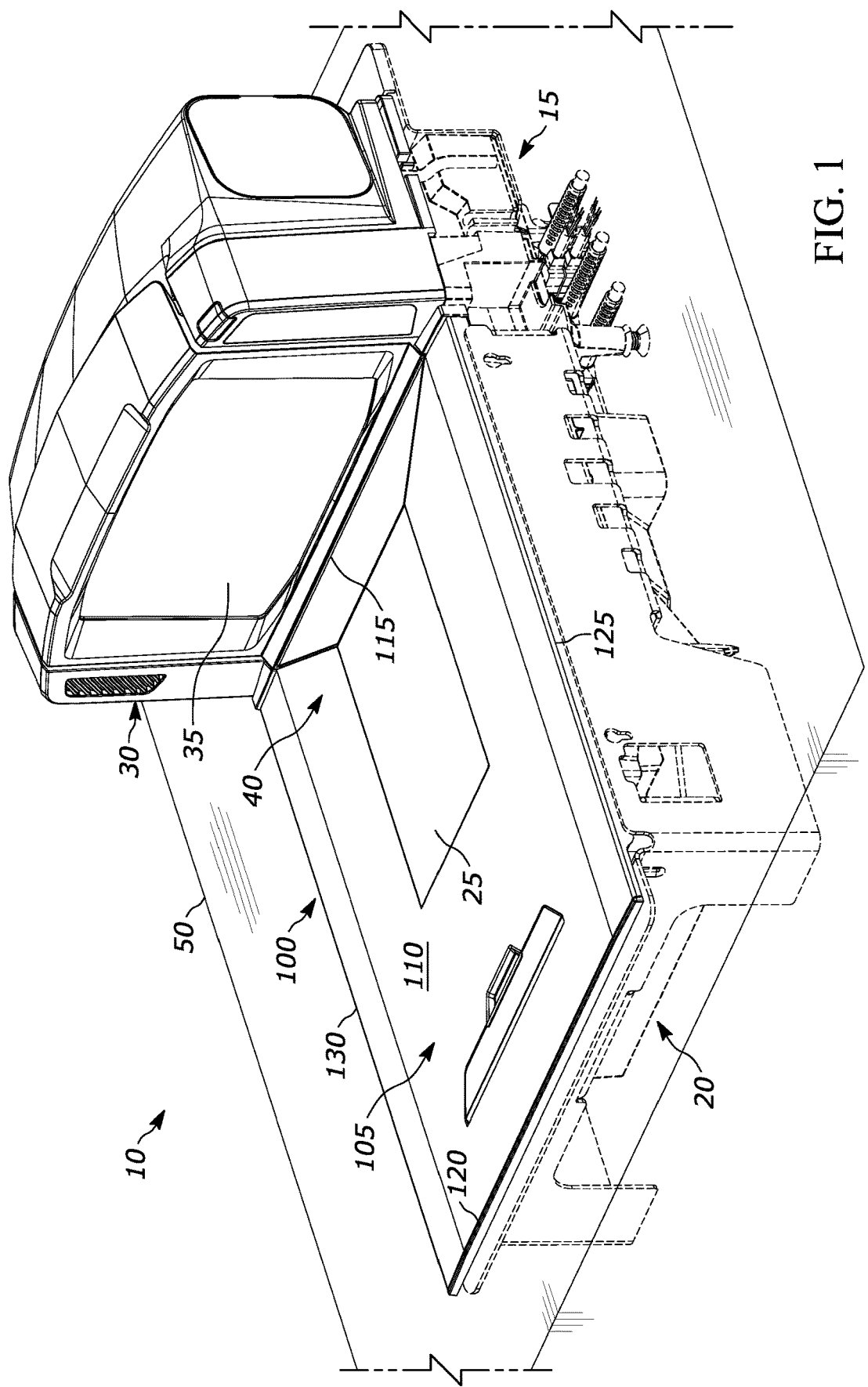
FIG. 1 illustrates a front perspective view of an example barcode reader is shown.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example barcode readers disclosed herein have off-platter detection assemblies that can detect when a portion of the off-platter detection assembly may need to be cleaned or repaired. As described herein, this can be done by setting one or more thresholds that indicate that maintenance or repair is required and, if a light detection signal is within the thresholds for a predetermined time, or during periods when product scanning is not taking place, triggering an event to alert a user of the maintenance or repair event.

Referring to FIG. 1, an example barcode reader 10, such as the Zebra® MP7000 bioptic barcode reader, is shown and can be configured to be supported by a workstation 50, such as a checkout counter at a point-of-sale (POS) of a retail store. Barcode reader 10 has a housing 15 that houses a weigh platter assembly 100 and includes a lower housing 20 and an upper housing 30 that extends above lower housing 20. Upper housing 30 includes a generally vertical window 35 to allow a first set of optical components positioned within housing 15 to direct a first field-of-view through vertical window 35. In addition, if barcode reader 10 is a bioptic barcode reader, barcode reader 10 will include a generally horizontal window 25, which in the example shown is positioned in a weigh platter 105 of weigh platter assembly 100 to allow a second set of optical components positioned within housing 15 to direct a second field of view through horizontal window 25. The first and second fields of view intersect to define a product scanning region 40 of barcode reader 10 where a product can be scanned for sale at the POS.

Weigh platter assembly 100 of barcode reader 10 includes a weigh platter 105 and is configured to measure the weight of an object placed on weigh platter 105. Weigh platter 105 has surface 110 that is generally parallel to a top surface of workstation 50 and extends in a first transverse plane, a proximal edge 115, a distal edge 120, a first lateral edge 125, and a second lateral edge 130. In the example shown, proximal edge 115 is adjacent upper housing 30 and would be the edge furthest from a user of weigh platter assembly 100 and/or barcode reader 10. First and second lateral edges 125, 130 extend non-parallel to proximal edge 115. Distal edge 120 is opposite proximal edge 115, would be the edge closest to the user, and extends non-parallel to first and second lateral edges 125, 130. In the example shown, weigh platter 105 is generally rectangular and first and second lateral edges 125, 130 are perpendicular to proximal edge 115 and distal edge 120 is perpendicular to first and second lateral edges 125, 130 and parallel to proximal edge 115.

Figure 2:
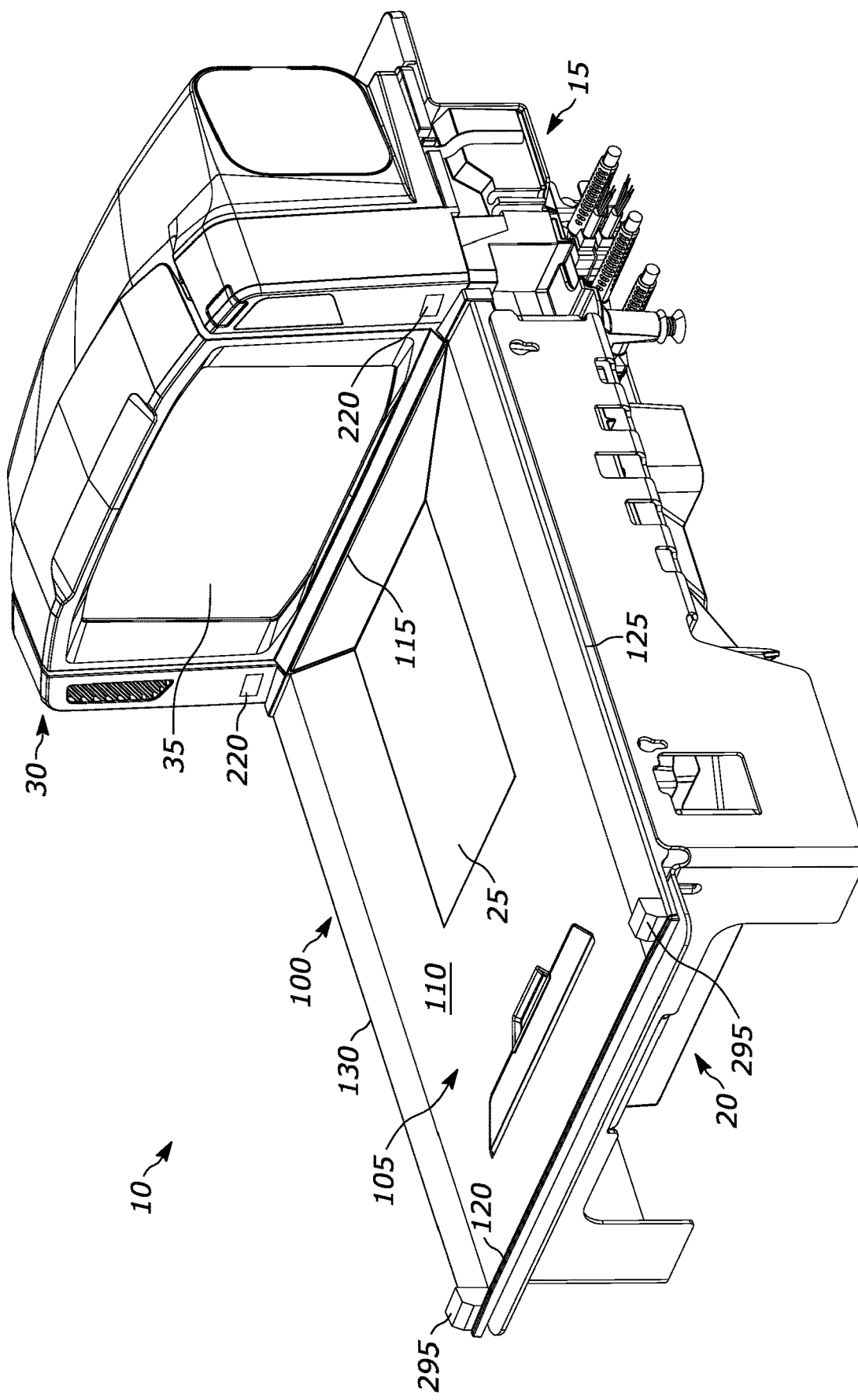
FIG. 2 illustrates a front perspective view of the barcode reader of FIG. 1 with a first example off-platter detection assembly.
Figure 3:
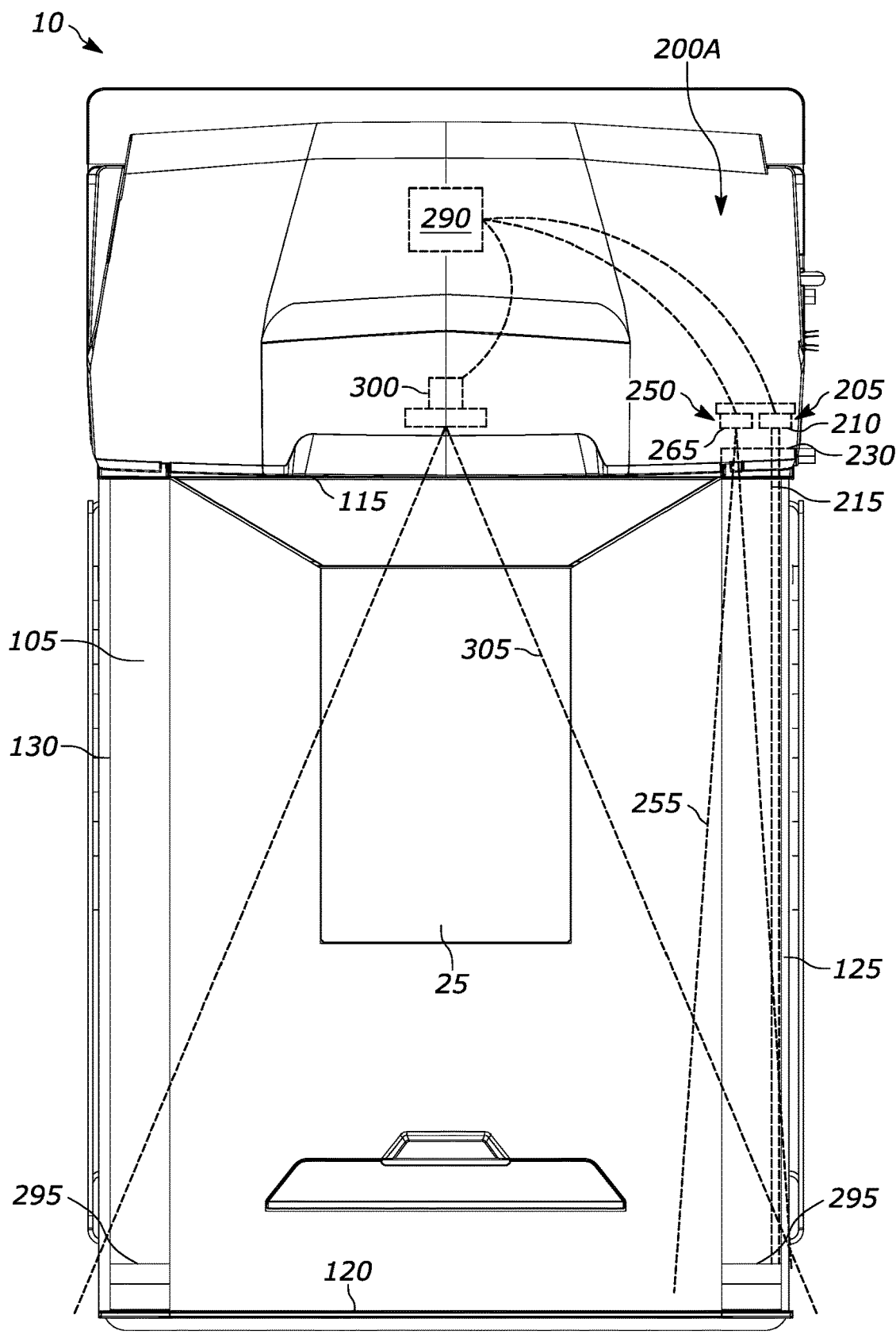
FIG. 3 illustrates a top view of the barcode reader of FIG. 2.

Referring to FIGS. 2-3, barcode reader 10 is illustrated with a first example off-platter detection assembly 200A. Off-platter detection assembly 200A generally includes a light emission assembly 205, light detection assembly 250, a controller 290 in communication with light emission assembly 205 and light detection assembly 250, and a retroreflector 295 positioned at distal edge 120 of weigh platter 105, opposite light emission assembly 205. For simplicity, only a single light emission assembly 205, light detection assembly 250, and retroreflector 295 along first lateral edge 125 are described herein, however, it will be understood that off-platter detection assembly 200A can also include a second light emission assembly, a second light detection assembly, and a second retroreflector aligned along second lateral edge 130 of weigh platter 105 to detect objects that extend over second lateral edge 130, opposite first lateral edge 125.

In the example shown in FIGS. 2-3, light emission assembly 205 is located within upper housing 30 of housing 15, has a light source 210, and is configured to emit a light 215 through a window 220 and away from proximal edge 115, towards distal edge 120 and retroreflector 295, and along first lateral edge 125 of weigh platter 105. Light source 210 could be an LED that is focused into a narrow beam, similar to an aiming dot used in scanners, a focused laser beam, etc., and light 215 could be pulses of light (such as in a light imaging, detection, and ranging (LI DAR) system) or a continuous light beam and could be on the infrared wavelength, visible light wavelength, or any wavelength desired. Retroreflector 295 can be made of a material and/or color that reflects a wavelength of light 215 back towards proximal edge 115 of weigh platter 105.

Light detection assembly 250 can also be located within housing 15, behind window 220, and has a field-of-view 255 that extends from proximal edge 115 to at least distal edge 120 and along first lateral edge 125. Light detection assembly 250 has a light sensor 265 and is configured to detect light 215, from one or more pulses of light or a continuous infrared light beam from light emission assembly 205, that is reflected from retroreflector 295 or from an object that extends across light 215, and therefore off weigh platter 105, towards proximal edge 115 and within field-of-view 255.

Light sensor 265 can be positioned below or beside light source 210 and could also be located on the same printed circuit board as light sensor 265.

Controller 290 is in communication with light source 210 of light emission assembly 205 and light sensor 265 of light detection assembly 250 and is configured to receive a light detection signal from light detection assembly 250.

If light emission assembly 205 is configured to emit a continuous light beam, such as a continuous infrared light beam, from light source 210, the light detection signal from light detection assembly 250 could be a signal strength of the reflected light from retroreflector 295 or object that is detected by light sensor 265. Controller 290 can then be configured to determine if an object extends across first lateral edge 125 and off of weigh platter 105 by comparing the light detection signal to a first signal threshold and determining if the light detection signal is less than the first signal threshold. For example, the first signal threshold could be 10 percent of a calibration signal, which would be the signal strength of the light reflected from retroreflector 295 detected by light detection assembly 250 without anything (i.e., an object, dirt, debris, etc.) impeding the path of light 215 from light source 210 to retroreflector 295 and from retroreflector 295 to light sensor 265. The calibration signal can be set at the factory or on-site during calibration of barcode reader 10. If the light detection signal is greater than the first signal threshold, this indicates that there is no object extending across first lateral edge 125 between proximal edge 115 and distal edge 120. If the light detection signal is less than the first signal threshold, this indicates that there is an object extending across first lateral edge 125 between proximal edge 115 and distal edge 120 and, if controller 290 determines that the light detection signal is equal to or less than the first signal threshold, controller 290 can be configured to execute a first event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a maintenance event is required by determining if the light detection signal is within a second signal threshold range for a predetermined period of time. A maintenance event could be an indication that retroreflector 295 or window 220 need to be cleaned, that dirt or debris needs to be removed from the path of light 215 between light source 210 and light sensor 265, etc. The second signal threshold range has a lowest value that is greater than the first signal threshold and could be between 70 percent and 90 percent of the calibration signal and the predetermined time could be at least 60 second. The light detection signal is monitored for the predetermined period of time to avoid off-platter detection assembly 200A thinking that a maintenance event is required based on reductions in the light detection signal that can occur during normal operations of barcode reader 10, for example, a user scanning a product. If the light detection signal is greater than the highest value of the second signal threshold range, this indicates that the retroreflector 295 and window 220 are sufficiently clean for acceptable operation and there is no dirt or debris if the path of light 215 between light source 210 and light sensor 265. If the light detection signal is within the second signal threshold range for longer than the predetermined time, this indicates that there is something impeding the path of light 215 between light source 210 and light sensor 265 (i.e., dirt on retroreflector 295 or window 220) and, if controller 290 determines that the light detection signal is within the second signal threshold range for the predetermined time, controller 290 can be configured to execute a second event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a repair event is required by determining if the light detection signal is within a third signal threshold range for the predetermined period of time. A repair event could be an indication that retroreflector 295 or window 220 is damage or missing and needs to be repaired or replaced. The third signal threshold range has a lowest value that is greater than the first signal threshold and a highest value that is less than or equal to the lowest value of the second signal threshold range and could be between 50 percent and 70 percent of the calibration signal. If the light detection signal is within the third signal threshold range for longer than the predetermined time, this indicates that there could be something wrong with retroreflector 295 and/or window 220 and, if controller 290 determines that the light detection signal is within the third signal threshold range for the predetermined time, controller 290 can be configured to execute a third event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system. If off-platter detection assembly 200A is configured to monitor for both maintenance and repair events, the second event (indicating a maintenance event could be required) could be providing a providing a visual and/or audio alert through barcode reader 10 or through the POS system and the third event (indicating that a repair event could be required) could be preventing weigh platter assembly 100 from measuring a weight of object placed on weigh platter 105, and/or preventing communication of the weight measured by weigh platter assembly 100 with the POS system.

If light emission assembly 205 is configured to emit one or more pulses of light from light source 210, the light detection signal from light detection assembly 250 could be a time-of-flight (TOF) of the reflected light from retroreflector 295 or object and a signal strength of the detected light that is detected by light sensor 265. The TOF is the time elapsed from when the pulse of light is emitted by light emission assembly 205 to when at least a portion of the pulse of light is reflected back to and detected by light detection assembly 250. Controller 290 can then be configured to determine if an object extends across first lateral edge 125 and off of weigh platter 105 by determining if the light detection signal is less than the first signal threshold. For example, the first signal threshold could be a calibration TOF, which would be the TOF without anything (i.e., an object, dirt, debris, etc.) impeding the path of light 215 from light source 210 to retroreflector 295 and from retroreflector 295 to light sensor 265. The calibration TOF can be set at the factory or on-site during calibration of barcode reader 10. If TOF of the light detection signal is less than the first signal threshold (the calibration TOF), this indicates that there is an object extending across first lateral edge 125 between proximal edge 115 and distal edge 120 and, if controller 290 determines that the light detection signal is less than the first signal threshold, controller 290 can be configured to execute a first event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a maintenance event is required by determining if the signal strength portion of the light detection signal for a given TOF is within a second signal threshold range, which has a lowest value that is greater than the first signal threshold, fora predetermined period of time. For example, if the TOF portion of the light detection signal is equal to the calibration TOF, but the signal strength portion of the light detection signal is less than a calibration signal strength for the predetermined time, this can indicate that there is something impeding the path of light 215 between light source 210 and light sensor 265 (i.e., dirt on retroreflector 295 or window 220) and, if controller 290 determines that the light detection signal is within the second signal threshold range for the predetermined time, controller 290 can be configured to execute a second event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a repair event is required by determining if the signal strength portion of the light detection signal for a given TOF is within a third signal threshold range for the predetermined period of time. A repair event could be an indication that retroreflector 295 or window 220 is damage or missing and needs to be repaired or replaced. The third signal threshold range has a lowest value that is greater than the first signal threshold and a highest value that is less than or equal to the lowest value of the second signal threshold range and could be between 50 percent and 70 percent of the calibration signal. If the light detection signal is within the third signal threshold range for longer than the predetermined time, this indicates that there could be something wrong with retroreflector 295 and/or window 220 and, if controller 290 determines that the light detection signal is within the third signal threshold range for the predetermined time, controller 290 can be configured to execute a third event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system. If off-platter detection assembly 200A is configured to monitor for both maintenance and repair events, the second event (indicating a maintenance event could be required) could be providing a providing a visual and/or audio alert through barcode reader 10 or through the POS system and the third event (indicating that a repair event could be required) could be preventing weigh platter assembly 100 from measuring a weight of object placed on weigh platter 105, and/or preventing communication of the weight measured by weigh platter assembly 100 with the POS system.

Alternatively, barcode reader 10 can also include an imaging device 300, such as a color camera, positioned within housing 15, preferably within upper housing 30 and proximate a top portion of vertical window 35, and in communication with controller 290. Imaging device 300 can have a FOV 305 that encompasses distal edge 120 of weigh platter 105 and retroreflector 295 and controller 290 can be configured to analyze images captured by imaging device 300 and determine if retroreflector 295 is damaged or missing or if there is dirt or debris covering retroreflector 295.

In operation, light emission assembly 205 of off-platter detection assembly 200A emits light 215 from light source 210 along first lateral edge 125 of weigh platter 105 and towards retroreflector 295. Light 215 is then reflected from retroreflector 295 back towards light detection assembly 250, which sends the light detection signal to controller 290. Controller 290 receives the light detection signal from light detection assembly 250 and compares the light detection signal to the first signal threshold and the second signal threshold range. Controller 290 can also compare the light detection signal to the third signal threshold range if configured in this manner. If controller 290 determines that the light detection signal is less than the first signal threshold, controller 290 executes a first event to indicate an off-platter event. If controller 290 determines that the light detection signal is within the second signal threshold range for the predetermined time, controller 290 executes a second event to indicate a maintenance event. If controller 290 determines that the light detection signal is within the third signal threshold range for the predetermined time, controller 290 executes a third event to indicate a repair event. If barcode reader 10 includes imaging device 300, controller 290 can also receive an image capture from imaging device 300 and analyze the image capture to determine if retroreflector 295 is damaged or missing or if there is dirt or debris covering retroreflector 295 or if there is any other maintenance type event.

Figure 4:
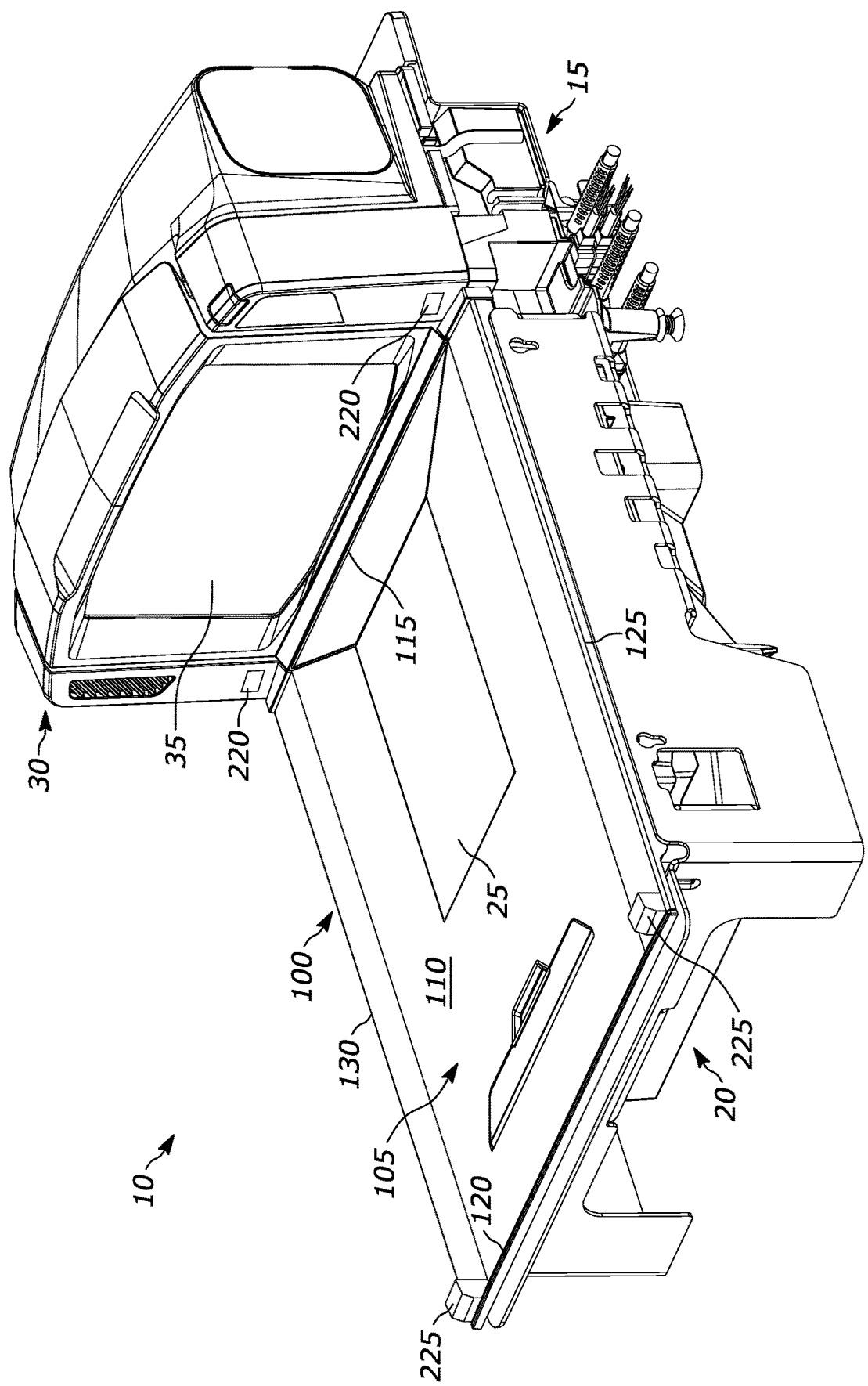
FIG. 4 illustrates a front perspective view of the barcode reader of FIG. 1 with a second example off-platter detection assembly.
Figure 5:
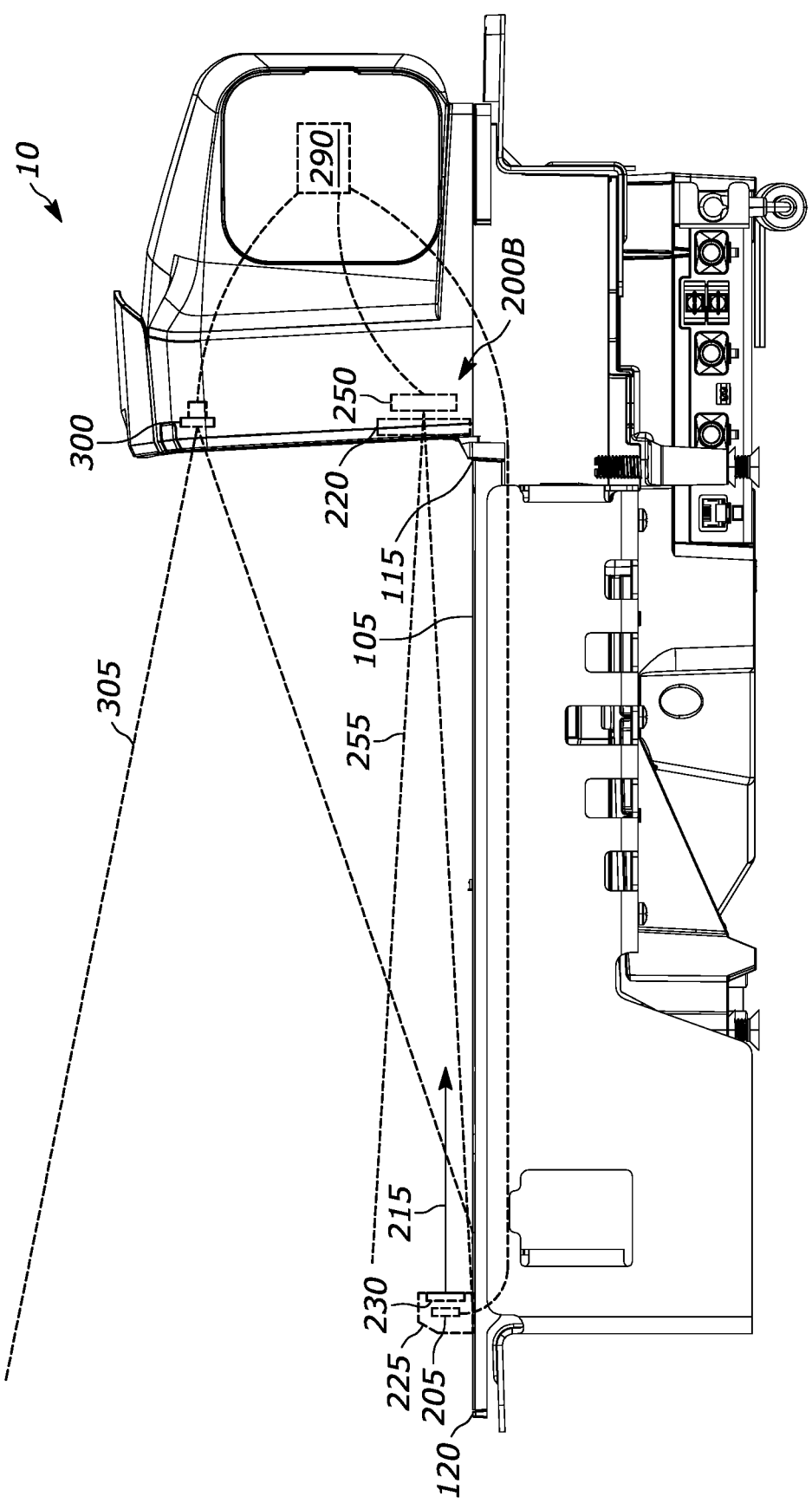
FIG. 5 illustrates a side view of the barcode reader of FIG. 4.

Referring to FIGS. 4-5, barcode reader 10 is illustrated with a second example off-platter detection assembly 200B, where light emission assembly 205 and light detection assembly 250 are located at opposite edges of weigh platter 105, rather than the same side of weigh platter 105. Like off-platter detection assembly 200A, off-platter detection assembly 200B generally includes light emission assembly 205, light detection assembly 250, and controller 290 in communication with light emission assembly 205 and light detection assembly 250. However, in off-platter detection assembly 200B, light emission assembly 205 is located at distal edge 120 of weigh platter 105, light detection assembly 250 is located at proximal edge 115 of weigh platter 105, and light emission assembly 205 emits light 215 from distal edge 120 and towards proximal edge 115 and light detection assembly 250. Alternatively, the locations of light emission assembly 205 and light detection assembly 250 could also be reversed, with light emission assembly 205 being located at proximal edge 115 and light detection assembly 250 being located at distal edge 120. For simplicity, only a single light emission assembly 205 and light detection assembly 250 along first lateral edge 125 are described herein, however, it will be understood that off-platter detection assembly 200B can also include a second light emission assembly and a second light detection assembly aligned along second lateral edge 130 of weigh platter 105 to detect objects that extend over second lateral edge 130, opposite first lateral edge 125.

In the example shown in FIGS. 4-5, light emission assembly 205 is located within a distal housing 225 located at distal edge 120 of weigh platter 105, has light source 210, and is configured to emit light 215 through a window 230 in distal housing 225, towards proximal edge 115, and along first lateral edge 125 of weigh platter 105. In this example, light source 210 could be an LED that is focused into a narrow beam, similar to an aiming dot used in scanners, a focused laser beam, etc., and light 215 could be a continuous light beam that could be on the infrared wavelength, visible light wavelength, or any wavelength desired.

Light detection assembly 250 is located at proximal edge 115 of weigh platter 105 within housing 15, behind window 220, and has field-of-view 255 that extends from proximal edge 115 to at least distal edge 120 and along first lateral edge 125. Light detection assembly 250 has light sensor 265 and is configured to detect light 215 from light emission assembly 205 within field-of-view 255.

Controller 290 is in communication with light source 210 of light emission assembly 205 and light sensor 265 of light detection assembly 250 and is configured to receive a light detection signal from light detection assembly 250.

The light detection signal from light detection assembly 250 could be a signal strength of light 215 that is detected by light sensor 265. Controller 290 can then be configured to determine if an object extends across first lateral edge 125 and off of weigh platter 105 by comparing the light detection signal to a first signal threshold and determining if the light detection signal is less than the first signal threshold. For example, the first signal threshold could be 10 percent of a calibration signal, which would be the signal strength of light 215 from light emission assembly 205 and detected by light detection assembly 250 without anything (i.e., an object, dirt, debris, etc.) impeding the path of light 215 from light source 210 to light sensor 265. The calibration signal can be set at the factory or on-site during calibration of barcode reader 10. If the light detection signal is greater than the first signal threshold, this indicates that there is no object extending across first lateral edge 125 between proximal edge 115 and distal edge 120. If the light detection signal is less than the first signal threshold, this indicates that there is an object extending across first lateral edge 125 between proximal edge 115 and distal edge 120 and, if controller 290 determines that the light detection signal is equal to or less than the first signal threshold, controller 290 can be configured to execute a first event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a maintenance event is required by determining if the light detection signal is within a second signal threshold range for a predetermined period of time. A maintenance event could be an indication that window 220 or window 230 need to be cleaned, that dirt or debris needs to be removed from the path of light 215 between light source 210 and light sensor 265, etc. The second signal threshold range has a lowest value that is greater than the first signal threshold and could be between 70 percent and 90 percent of the calibration signal and the predetermined time could be at least 60 second. The light detection signal is monitored for the predetermined period of time to avoid off-platter detection assembly 200B thinking that a maintenance event is required based on reductions in the light detection signal that can occur during normal operations of barcode reader 10, for example, a user scanning a product. If the light detection signal is greater than the highest value of the second signal threshold range, this indicates that window 220 and window 230 are sufficiently clean for acceptable operation and there is no dirt or debris if the path of light 215 between light source 210 and light sensor 265. If the light detection signal is within the second signal threshold range for longer than the predetermined time, this indicates that there is something impeding the path of light 215 between light source 210 and light sensor 265 (i.e., dirt on window 220 or window 230) and, if controller 290 determines that the light detection signal is within the second signal threshold range for the predetermined time, controller 290 can be configured to execute a second event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a repair event is required by determining if the light detection signal is within a third signal threshold range for the predetermined period of time. A repair event could be an indication that window 220 and/or window 230 are damage or missing and need to be repaired or replaced. The third signal threshold range has a lowest value that is greater than the first signal threshold and a highest value that is less than or equal to the lowest value of the second signal threshold range and could be between 50 percent and 70 percent of the calibration signal. If the light detection signal is within the third signal threshold range for longer than the predetermined time, this indicates that there could be something wrong with window 220 and/or window 230 and, if controller 290 determines that the light detection signal is within the third signal threshold range for the predetermined time, controller 290 can be configured to execute a third event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system. If off-platter detection assembly 200B is configured to monitor for both maintenance and repair events, the second event (indicating a maintenance event could be required) could be providing a providing a visual and/or audio alert through barcode reader 10 or through the POS system and the third event (indicating that a repair event could be required) could be preventing weigh platter assembly 100 from measuring a weight of object placed on weigh platter 105, and/or preventing communication of the weight measured by weigh platter assembly 100 with the POS system.

Alternatively, barcode reader 10 can also include an imaging device 300, such as a color camera, positioned within housing 15, preferably within upper housing 30 and proximate a top portion of vertical window 35, and in communication with controller 290. Imaging device 300 can have a FOV 305 that encompasses distal edge 120 of weigh platter 105, distal housing 225, and window 230 and controller 290 can be configured to analyze images captured by imaging device 300 and determine if distal housing 225 and/or window 230 is damaged or missing or if there is dirt or debris covering window 230.

In operation, light emission assembly 205 of off-platter detection assembly 200B emits light 215 from light source 210 along first lateral edge 125 of weigh platter 105 from distal edge 120 of weigh platter 105 and towards proximal edge 115. Light 215 is then detected by light detection assembly 250, which sends the light detection signal to controller 290. Controller 290 receives the light detection signal from light detection assembly 250 and compares the light detection signal to the first signal threshold and the second signal threshold range. Controller 290 can also compare the light detection signal to the third signal threshold range if configured in this manner. If controller 290 determines that the light detection signal is less than the first signal threshold, controller 290 executes a first event to indicate an off-platter event. If controller 290 determines that the light detection signal is within the second signal threshold range for the predetermined time, controller 290 executes a second event to indicate a maintenance event. If controller 290 determines that the light detection signal is within the third signal threshold range for the predetermined time, controller 290 executes a third event to indicate a repair event. If barcode reader 10 includes imaging device 300, controller 290 can also receive an image capture from imaging device 300 and analyze the image capture to determine if distal housing 225 and/or window 230 are damaged or missing or if there is dirt or debris covering window 230 or if there is any other maintenance type event.

Figure 6:
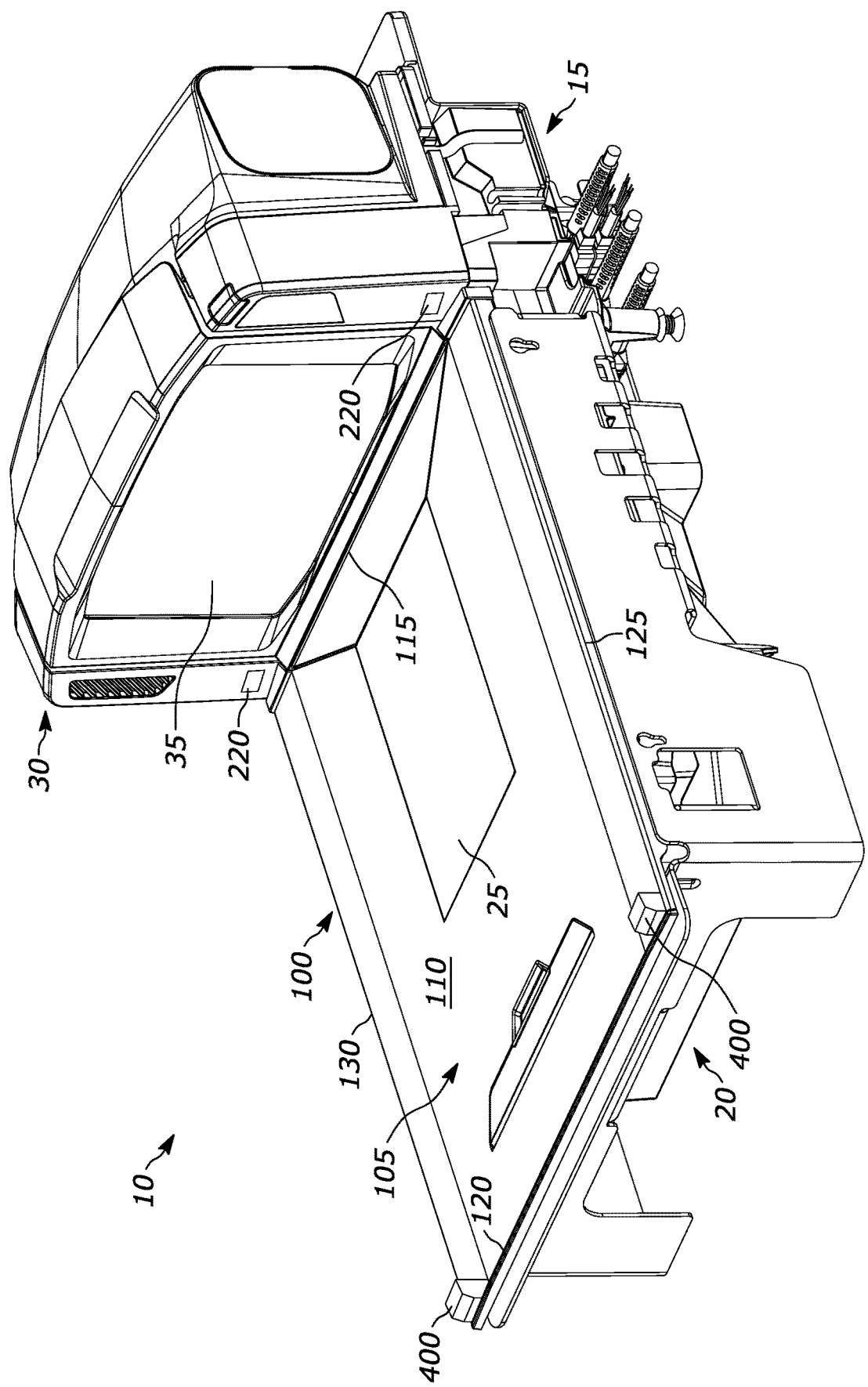
FIG. 6 illustrates a front perspective view of the barcode reader of FIG. 1 with a third example off-platter detection assembly.
Figure 7:
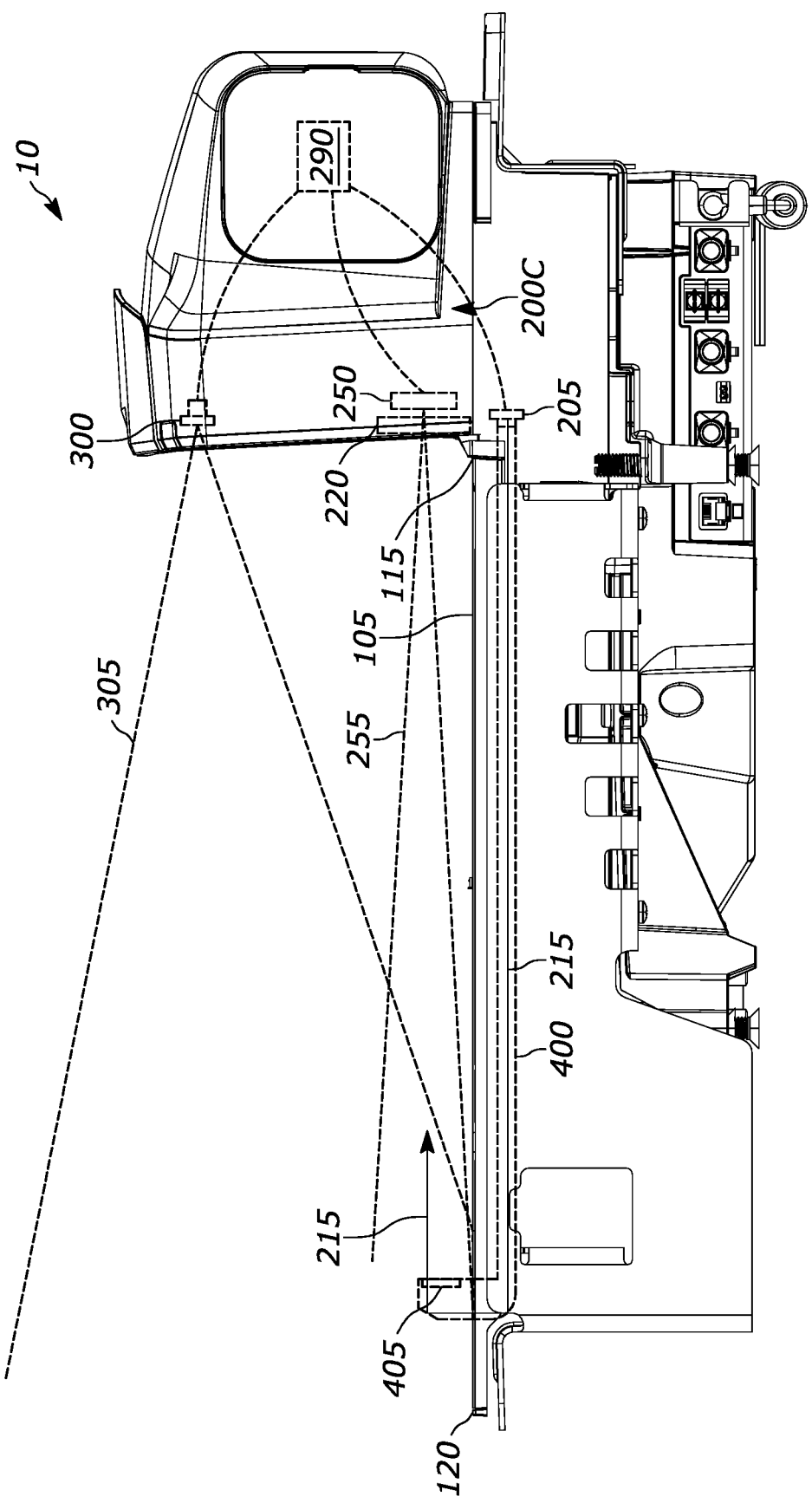
FIG. 7 illustrates a side view of the barcode reader of FIG. 6.

Referring to FIGS. 6-7, barcode reader 10 is illustrated with a third example off-platter detection assembly 200C, where light emission assembly 205 and light detection assembly 250 are both located at proximal edge 115 of weigh platter 105 and light 215 is emitted from distal edge 120 of weigh platter 105 via a light pipe 400. Like off-platter detection assembly 200A, off-platter detection assembly 200B generally includes light emission assembly 205, light detection assembly 250, and controller 290 in communication with light emission assembly 205 and light detection assembly 250. However, in off-platter detection assembly 200C, light emission assembly 205 emits light 215 from distal edge 120 and towards proximal edge 115 and light detection assembly 250 via a light pipe 400. For simplicity, only a single light emission assembly 205 and light detection assembly 250 along first lateral edge 125 are described herein, however, it will be understood that off-platter detection assembly 200C can also include a second light emission assembly and a second light detection assembly aligned along second lateral edge 130 of weigh platter 105 to detect objects that extend over second lateral edge 130, opposite first lateral edge 125.

In the example shown in FIGS. 6-7, light emission assembly 205 is located within housing 15 at proximal edge 115 of weigh platter 105, has light source 210, and is configured to direct light 215 through a light pipe 400 and out a window 405 at the end of light pipe 400, which is located at distal edge 120 of weigh platter 105. Light pipe 400 extends along the length of weigh platter 105 and includes a number of reflective surfaces to direct light 215 from light source 210 through light pipe 400 and out of window 405 so that light 215 is directed from distal edge 120 of weigh platter 105, towards proximal edge 115, and along first lateral edge 125. In this example, light source 210 could be an LED that is focused into a narrow beam, similar to an aiming dot used in scanners, a focused laser beam, etc., and light 215 could be a continuous light beam that could be on the infrared wavelength, visible light wavelength, or any wavelength desired.

Light detection assembly 250 is also located at proximal edge 115 of weigh platter 105 within housing 15, behind window 220, and has field-of-view 255 that extends from proximal edge 115 to at least distal edge 120 and along first lateral edge 125. Light detection assembly 250 has light sensor 265 and is configured to detect light 215 from light emission assembly 205 directed through window 405 and towards proximal edge 115 and light detection assembly 250, within field-of-view 255.

Controller 290 is in communication with light source 210 of light emission assembly 205 and light sensor 265 of light detection assembly 250 and is configured to receive a light detection signal from light detection assembly 250.

The light detection signal from light detection assembly 250 could be a signal strength of light 215 that is detected by light sensor 265. Controller 290 can then be configured to determine if an object extends across first lateral edge 125 and off of weigh platter 105 by comparing the light detection signal to a first signal threshold and determining if the light detection signal is less than the first signal threshold. For example, the first signal threshold could be 10 percent of a calibration signal, which would be the signal strength of light 215 from light emission assembly 205 and detected by light detection assembly 250 without anything (i.e., an object, dirt, debris, etc.) impeding the path of light 215 from light source 210 to light sensor 265. The calibration signal can be set at the factory or on-site during calibration of barcode reader 10. If the light detection signal is greater than the first signal threshold, this indicates that there is no object extending across first lateral edge 125 between proximal edge 115 and distal edge 120. If the light detection signal is less than the first signal threshold, this indicates that there is an object extending across first lateral edge 125 between proximal edge 115 and distal edge 120 and, if controller 290 determines that the light detection signal is equal to or less than the first signal threshold, controller 290 can be configured to execute a first event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a maintenance event is required by determining if the light detection signal is within a second signal threshold range for a predetermined period of time. A maintenance event could be an indication that window 220, window 405, or light pipe 400 need to be cleaned, that dirt or debris needs to be removed from the path of light 215 between light source 210 and light sensor 265, etc. The second signal threshold range has a lowest value that is greater than the first signal threshold and could be between 70 percent and 90 percent of the calibration signal and the predetermined time could be at least 60 second. The light detection signal is monitored for the predetermined period of time to avoid off-platter detection assembly 200C thinking that a maintenance event is required based on reductions in the light detection signal that can occur during normal operations of barcode reader 10, for example, a user scanning a product. If the light detection signal is greater than the highest value of the second signal threshold range, this indicates that window 220, window 405, and light pipe 400 are sufficiently clean for acceptable operation and there is no dirt or debris if the path of light 215 between light source 210 and light sensor 265. If the light detection signal is within the second signal threshold range for longer than the predetermined time, this indicates that there is something impeding the path of light 215 between light source 210 and light sensor 265 (i.e., dirt on window 220 or window 405, dirt or debris within light pipe 400, etc.) and, if controller 290 determines that the light detection signal is within the second signal threshold range for the predetermined time, controller 290 can be configured to execute a second event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system.

Controller 290 can also be configured to determine if a repair event is required by determining if the light detection signal is within a third signal threshold range for the predetermined period of time. A repair event could be an indication that window 220, window 405, and/or light pipe 400 are damage or missing and need to be repaired or replaced. The third signal threshold range has a lowest value that is greater than the first signal threshold and a highest value that is less than or equal to the lowest value of the second signal threshold range could be between 50 percent and 70 percent of the calibration signal. If the light detection signal is within the third signal threshold range for longer than the predetermined time, this indicates that there could be something wrong with window 220, window 405, and/or light pipe 400 and, if controller 290 determines that the light detection signal is within the third signal threshold range for the predetermined time, controller 290 can be configured to execute a third event, such as providing a visual and/or audio alert through barcode reader 10 or through the POS system, preventing weigh platter assembly 100 from measuring a weight of object placed on weigh platter 105, and/or preventing communication of the weight measured by weigh platter assembly 100 with the POS system. If off-platter detection assembly 200C is configured to monitor for both maintenance and repair events, the second event (indicating a maintenance event could be required) could be providing a providing a visual and/or audio alert through barcode reader 10 or through the POS system and the third event (indicating that a repair event could be required) could be preventing weigh platter assembly 100 from measuring a weight of object placed on weigh platter 105, and/or preventing communication of the weight measured by weigh platter assembly 100 with the POS system.

Alternatively, barcode reader 10 can also include an imaging device 300, such as a color camera, positioned within housing 15, preferably within upper housing 30 and proximate a top portion of vertical window 35, and in communication with controller 290. Imaging device 300 can have a FOV 305 that encompasses distal edge 120 of weigh platter 105 and window 405 and controller 290 can be configured to analyze images captured by imaging device 300 and determine if window 405 is damaged or missing or if there is dirt or debris covering window 405.

In operation, light emission assembly 205 of off-platter detection assembly 200C emits light 215 from light source 210 through light pipe 400, which directs light 215 along first lateral edge 125 of weigh platter 105 from distal edge 120 of weigh platter 105 and towards proximal edge 115. Light 215 is then detected by light detection assembly 250, which sends the light detection signal to controller 290. Controller 290 receives the light detection signal from light detection assembly 250 and compares the light detection signal to the first signal threshold and the second signal threshold range. Controller 290 can also compare the light detection signal to the third signal threshold range if configured in this manner. If controller 290 determines that the light detection signal is less than the first signal threshold, controller 290 executes a first event to indicate an off-platter event. If controller 290 determines that the light detection signal is within the second signal threshold range for the predetermined time, controller 290 executes a second event to indicate a maintenance event. If controller 290 determines that the light detection signal is within the third signal threshold range for the predetermined time, controller 290 executes a third event to indicate a repair event. If barcode reader 10 includes imaging device 300, controller 290 can also receive an image capture from imaging device 300 and analyze the image capture to determine if window 405 is damaged or missing or if there is dirt or debris covering window 405 or if there is any other maintenance type event.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader configured to be supported by a workstation, the barcode reader comprising:
    a weigh platter assembly having a weigh platter, the weigh platter assembly configured to measure a weight of an object placed on the weigh platter; and
    an off-platter detection assembly comprising:
        a light emission assembly having a light source, the light emission assembly configured to emit a light along a first lateral edge of the weigh platter;
        a light detection assembly having a light sensor, the light detection assembly configured to detect at least a portion of the light from the light emission assembly; and
        a controller in communication with the light emission assembly and the light detection assembly, the controller configured to:
            receive a light detection signal from the light detection assembly;
            compare the light detection signal to a first signal threshold and a second signal threshold range;
            execute a first event if the light detection signal is less than the first signal threshold, indicating an off-platter event; and
            execute a second event if the light detection signal is within the second signal threshold range for a predetermined period of time, indicating a maintenance event, wherein a lowest value of the second signal threshold range is greater than the first signal threshold.

2. The barcode reader of claim 1, comprising a retroreflector positioned at a distal edge of the weigh platter, wherein the light emission assembly emits the light from a proximal edge of the weigh platter towards the retroreflector and the light detection assembly detects the light reflected from the retroreflector.

3. The barcode reader of claim 2, comprising an imaging device having a field-of-view that encompasses the retroreflector, wherein the controller is configured to analyze an image captured by the imaging device and determine if the retroreflector is damaged or missing or if there is dirt or debris covering the retroreflector.

4. The barcode reader of claim 1, comprising an imaging device having a field-of-view that encompasses a distal edge of the weigh platter.

5. The barcode reader of claim 1, wherein the light emission assembly emits the light from a distal edge of the weigh platter towards a proximal edge of the weigh platter and towards the light detection assembly.

6. The barcode reader of claim 1, wherein the light detection signal comprises a time-of-flight (TOF) of reflected light, the TOF of reflected light comprising the time one or more pulses of light are emitted by the light emission assembly to the time the at least a portion of the one or more pulses of light are reflected back to and detected by the light detection assembly, and a signal strength of reflected light, the first signal threshold comprises a calibration TOF for detecting an off-platter event and the second signal threshold range comprises a minimum signal strength for a corresponding TOF for detecting a maintenance event.

7. The barcode reader of claim 1, wherein the second signal threshold range is between 70% and 90% of a calibration signal.

8. The barcode reader of claim 1, wherein the predetermine period of time is at least 60 seconds.

9. The barcode reader of claim 1, wherein the second event comprises one or more of: providing a visual and/or audio alert, preventing the weigh platter from measuring a weight of an object placed on the weigh platter, and/or preventing communication with a point-of-sale station associated with the barcode reader.

10. The barcode reader of claim 1, wherein the controller is configured to:
compare the light detection signal to a third signal threshold range; and
execute a third event if the light detection signal is within the third signal threshold range for the predetermined period of time, indicating a repair event, wherein a lowest value of the third signal threshold range is greater than the first signal threshold and a highest value of the third signal threshold is less than or equal to a lowest value of the second signal threshold range.

11. The barcode reader of claim 10, wherein the second event comprises providing a visual and/or audio alert and the third event comprises one or more of: preventing the weigh platter from measuring a weight of an object placed on the weigh platter, and/or preventing communication with a point-of-sale station associated with the barcode reader.

12. The barcode reader of claim 10, wherein the second signal threshold range is between 70% and 90% of a calibration signal and the third signal threshold range is between 50% and 70% of the calibration signal.

13. A method of monitoring a performance of an off-platter detection assembly of a barcode reader, comprising the steps of:
emitting a light along a first lateral edge of a weigh platter of the barcode reader with a light emission assembly;
receiving a light detection signal from a light detection assembly of the barcode reader at a controller of the barcode reader;
comparing, with the controller, the light detection signal to a first signal threshold and a second signal threshold range;
executing, with the controller, a first event if the light detection signal is less than the first signal threshold, indicating an off-platter event; and
executing, with the controller, a second event if the light detection signal is within the second signal threshold range for a predetermined period of time, indicating a maintenance event, wherein a lowest value of the second signal threshold range is greater than the first signal threshold.

14. The method of claim 13, comprising the step of positioning a retroreflector at a distal edge of the weigh platter, wherein the light is emitted from a proximal edge of weigh platter towards the retroreflector and the light detection assembly detects the light reflected from the retroreflector.

15. The method of claim 14, comprising the steps of: receiving at the controller an image capture from an imaging device of the barcode reader, the imaging device having a field-of-view that encompasses the retroreflector; and analyzing, with the controller, the image capture to determine if the retroreflector is damaged or missing or if there is dirt or debris covering the retroreflector.

16. The method of claim 13, comprising the steps of: receiving at the controller an image capture from an imaging device of the barcode reader, the imaging device having a field-of-view that encompasses a distal edge of the weigh platter; and analyzing, with the controller, the image capture to determine if there is a maintenance event.

17. The method of claim 13, wherein the light is emitted from a distal edge of the weigh platter towards a proximal edge of the weigh platter and the light detection assembly.

18. The method of claim 13, wherein the light detection signal comprises a time-of-flight (TOF) of reflected light, the TOF of reflected light comprising the time one or more pulses of light are emitted by the light emission assembly to the time the at least a portion of the one or more pulses of light are reflected back to and detected by the light detection assembly, and a signal strength of reflected light, the first signal threshold comprises a calibration TOF for detecting an off-platter event and the second signal threshold range comprises a minimum signal strength for a corresponding TOF for detecting a maintenance event.

19. The method of claim 13, wherein the second signal threshold range is between 70% and 90% of a calibration signal.

20. The method of claim 13, wherein the predetermine period of time is at least 60 seconds.

21. The method of claim 13, wherein the second event comprises one or more of: providing a visual and/or audio alert, preventing the weigh platter from measuring a weight of an object placed on the weigh platter, and/or preventing communication with a point-of-sale station associated with the barcode reader.

22. The method of claim 13, comprising the steps of:
comparing, with the controller, the light detection signal to a third signal threshold range; and
executing, with the controller, a third event if the light detection signal is within the third signal threshold range for the predetermined period of time, indicating a repair event, wherein a lowest value of the third signal threshold range is greater than the first signal threshold and a highest value of the third signal threshold is less than or equal to a lowest value of the second signal threshold range.

23. The method of claim 22, wherein the second event comprises providing a visual and/or audio alert and the third event comprises one or more of: preventing the weigh platter from measuring a weight of an object placed on the weigh platter, and/or preventing communication with a point-of-sale station associated with the barcode reader.

24. The method of claim 22, wherein the second signal threshold range is between 70% and 90% of a calibration signal and the third signal threshold range is between 50% and 70% of the calibration signal.

* * * * *